(12) United States Patent
Acharya

(10) Patent No.: US 8,364,162 B2
(45) Date of Patent: Jan. 29, 2013

(54) UE INITIATED FREQUENCY PARTITIONING BASED COMP SCHEME FOR DOWNLINK CELLULAR COMMUNICATIONS

(75) Inventor: Joydeep Acharya, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 12/687,405

(22) Filed: Jan. 14, 2010

(65) Prior Publication Data

US 2011/0171955 A1 Jul. 14, 2011

(51) Int. Cl.
*H04W 72/00* (2009.01)
(52) U.S. Cl. .............. 455/452.2; 455/432.1; 455/436; 455/442; 455/450; 455/453; 370/329; 370/330; 370/331; 370/332; 370/333
(58) Field of Classification Search .......... 455/421, 455/429, 432.1–453, 456.1–456.3, 509–513, 455/63.2–63.3; 370/328–333
See application file for complete search history.

(56) References Cited

U.S. PATENT DOCUMENTS

| | | | |
|---|---|---|---|
| 2008/0316955 A1 | 12/2008 | Yu | |
| 2009/0010219 A1 | 1/2009 | Lee et al. | |
| 2009/0201867 A1 | 8/2009 | Teo et al. | |
| 2009/0219875 A1 | 9/2009 | Kwak et al. | |
| 2009/0257390 A1 | 10/2009 | Ji et al. | |
| 2009/0323614 A1 | 12/2009 | Wang et al. | |
| 2010/0165930 A1* | 7/2010 | Zangi ............................ 370/329 |
| 2010/0173660 A1* | 7/2010 | Liu et al. ....................... 455/501 |
| 2010/0195599 A1* | 8/2010 | Zhang et al. .................. 370/329 |
| 2010/0304682 A1* | 12/2010 | Choi et al. .................... 455/63.1 |
| 2010/0323611 A1* | 12/2010 | Choudhury ..................... 455/7 |
| 2011/0237272 A1* | 9/2011 | Gorokhov et al. ......... 455/452.1 |
| 2011/0269449 A1* | 11/2011 | Kazmi et al. ............... 455/422.1 |
| 2012/0076038 A1* | 3/2012 | Shan et al. ................... 370/252 |

OTHER PUBLICATIONS

PCT International Search Report mailed on Sep. 19, 2011.

* cited by examiner

*Primary Examiner* — Dai A Phuong
(74) *Attorney, Agent, or Firm* — Procopio, Cory, Hargreaves & Savitch LLP

(57) ABSTRACT

In the embodiments of the present invention, proposed is a method in which a CoMP enabled UE chooses the BSs to be in its cooperating set and a BS partitions its bandwidth to serve its own UEs and UEs from other cells that have requested it to be in its cooperating set.

5 Claims, 7 Drawing Sheets

UE INITIATED FREQUENCY PARTITIONING BASED COMP SCHEME FOR DOWNLINK CELLULAR COMMUNICATIONS

BACKGROUND OF THE INVENTION

In traditional cellular systems, each cell transmits to its own user equipment (UE) and in the process creates interference to UEs in adjacent cells. This is illustrated in FIG. 1A. However, in coordinated multipoint transmission/reception (CoMP) based systems, multiple base stations (BSs) can coordinate to transmit to a UE as shown in FIG. 1B. There is rate gain from both coordination and also elimination of interference. "$3^{rd}$ Generation Partnership Project; Technical Specification Group Radio Access Network; Further Advancements for E-UTRA Physical Layer Aspects (Release 9), 3GPP TR 36.8.14 V0.4.1 (2009-03)" teaches that CoMP strategies fall into the following two strategies.

a) Coordinated scheduling and/or beamforming (CS/CB)
  i) Data to a single UE is transmitted from one of the transmission points where a transmission point means a BS in the set of cooperating BSs.
  ii) Scheduling decisions at different transmission points are coordinated to control the interference generated.
b) Joint processing/transmission (JP)
  i) Data to a single UE is simultaneously transmitted (coherently or non-coherently) from multiple transmission points to improve the received signal quality and/or cancel actively interference for other UEs.

The first step in any CoMP scheme, such as CS/CB or JP, is to decide which BS will cooperate for a given UE. In "R1-092232, Summary of email discussions CoMP v2", 3GPP TSG RAN WG1 meeting #57", the following terms are introduced in this context.

i) CoMP measurement set: Set of cells for a given UE whose link gains matrices are measured by the UE.
ii) CoMP Cooperating set: Set of cells that cooperate to transmit to a given UE.

In CS/CB user data need not be shared amongst cells in the cooperating set but in JP data needs to be shared.

The layout of cells is shown in FIG. 2. This is a model which is widely used for analysis and simulation of cellular systems as it is a close approximation of the real physical layout. It is considered that a 57 cell network organized in groups of 19 such that the base stations of the 3 cells within each group are co-located. Each of the 3 co-located base stations use a directional antenna that confines the majority of its transmitted signal energy into a sector of 120 degrees and the three sectors from three cells are non-overlapping. When there is no coordination, each UE is served by its serving cell. In case of CoMP, groups of cells can serve a given UE. Such groups can be formed either in a static way depending on cell geometry or dynamically, based on the link gains of the UEs to the cells.

In a static cooperating set formation, the clusters of cells are formed apriori to the UE signaling and reporting of link gain values to different cells. The formation of clusters is based on geometry. FIG. 3 shows two such configurations. In FIG. 3A, adjacent sectors belonging to different cell sites coordinate while in FIG. 3B, the three sectors belonging to the same cell site coordinate. For graphical clarity only one coordinating set is illustrated in the figure, the others can be obtained by repeating the pattern over the entire cellular area. In each case the cooperating set consists of three sectors and they serve all the UEs that are associated with any one of the three sectors. Static cooperating sets have been considered by many references, such as R1-0933177, "DL performance evaluation for ITU-R submission", 3GPP TSG RAN WG1 meeting #5", R1-093585, "A Simple Coordinated Scheduling Algorithm for Downlink CoMP", 3GPP TSG RAN WG1 meeting #58", and "H. Huang and M. Trivellato, "Performance of multiuser MIMO and network coordination in downlink cellular networks"".

The problem with static cooperating set formation is that, for a given UE, the cells that have the strongest link gain to it after its serving cell (i.e. the cell that serves it in case of no CoMP), may not lie in its cooperating set. These cells would then cause strong interference. This is possible due to the random nature of link gain of which the random shadowing component is the biggest factor. Thus, in another way of forming the cooperating set of a given UE, the UE first determines the cells with the strongest link gains (by measuring the Reference Signal Received Power or RSRP of all cells and finding out which ones lie within a threshold of the serving cell) and then reports this to its serving cell. The serving cell then decides to form a cooperating set with these cells. Such approaches have been considered in "R1-093410, "Coordinated Beamforming Algorithms Based on Spatial Covariance Feedback and its Gain over Single-point SU/MU Beamforming", 3GPP TSG RAN WG1 meeting #58".

Frequency partitioning is another important method that increases the overall system performance. One simple illustrative example could be that the total available spectrum is partitioned into disjoint bands to transmit to different classes of UEs. This mitigates the problem of interference and allows each cell to perform SU MIMO algorithms in these disjoint bands. The other alternative would have to transmit to the different UEs in the total band but use MU-MIMO beamforming to mitigate interference. The former approach of frequency partitioning can be easier to implement. Often different frequency bands are used for transmitting to uses in the cell edge as they are the most prone to interference. Such approaches have been considered in "R1-093279, "Downlink CoMP based on cooperative precoding", 3GPP TSG RAN WG1 meeting #58".

Coordinated Multipoint Transmission/Reception (CoMP) is considered to be an important feature for Release-10 (Rel-10) LTE-Advanced technology as this enhances the system data rate and reliability. CoMP involves multiple cells cooperating together to transmit to a single UE. In the future it is envisaged that there will be networks which will have a mixture of Release 8 (Rel-8) LTE UEs that do not support CoMP and Rel-10 UEs that have the option of using the CoMP mode, especially during the period of transition when the market moves from the current LTE stage to the future LTE-A stage.

If a UE is using the CoMP mode, the transmission set or the cells that cooperate to transmit to it, needs to be decided. Instead of forming fixed transmission sets based on cell geometry, it is better to form these dynamically based on the UE link gains to the various cells (R1-093410, "Coordinated Beamforming Algorithms Based on Spatial Covariance Feedback and its Gain over Single-point SU/MU Beamforming", 3GPP TSG RAN WG1 meeting #58).

At each Transmission Time Interval (TTI), the BS of a cell has to decide to which UE to transmit to amongst all UEs for which it is the serving cell. One approach would be to transmit to that UE to which it can support the highest data rate, which is the UE which has the best link gain to the BS. However as link gains are strongly dependant on distance, this means that most of the times the nearby UEs are scheduled. Thus this scheduling method is said to be unfair to the faraway UEs. To remedy this situation, the proportional fair (PF) metric has been introduced and is widely used in many wireless systems such as CDMA/HDR. In this method the BS calculates the instantaneous rate to a UE if that UE is scheduled and divides it by the average rate received by the UE till that TTI. The UE with the highest value of this metric is chosen for transmission. Thus in PF scheduling both instantaneous rate (strength of link gain) and average rate (long term fairness) is considered.

Thus, there is a need for efficient portioning of BS resources, such as time, bandwidth and also assigning BSs to cooperating sets of different UEs so that there is seamless operation of both Rel-8 and Rel-10 UEs.

BRIEF SUMMARY OF THE INVENTION

In the embodiments of the present invention, proposed is a method in which a Rel-10 (CoMP enabled) UE chooses the BSs to be in its cooperating set and a BS partitions its bandwidth to serve its own UEs and UEs from other cells that have requested it to be in its cooperating set.

In the beginning of each scheduling instant, each BS decides which UE to schedule to using a proportional fair (PF) metric. If the UE supports Rel-10 (i.e. CoMP enabled UE), it opts for entering the CoMP mode. It reports, to its serving cell, the cell-id of the cell to which it has the highest received signal power (as measured by the Reference Signal Received Power, RSRP) after the serving cell. The serving cell contacts this new cell and informs it of this request.

If a cell receives multiple such CoMP requests, it uses another PF metric to choose a single UE to transmit to. The PF metric looks at the extra rate increase of a UE if it was scheduled by this cell and the average rate of that UE till that TTI.

Each cell divides a portion of its available bandwidth to serve its own UE for which it is the serving cell and the rest is used to serve the UEs from other cells who hand in a CoMP request. This frequency portioning is the simplest scheme and ensures that within the allocated band, each cell carries out Single User (SU) beamforming as in Rel-8.

DETAILED DESCRIPTION OF THE INVENTION

In the embodiment of the present invention, an algorithm to be followed by the UEs and the BSs is provided so that each BS can determine whether it has to be a part of a cooperating set and if so then how much of its resources (e.g. power, bandwidth) to allocate in this cooperative transmission. One of the embodiments of this invention includes a system in which LTE and LTE-A enabled UEs can co-exist assuming that BSs are capable of running both protocols.

Figure 1A:
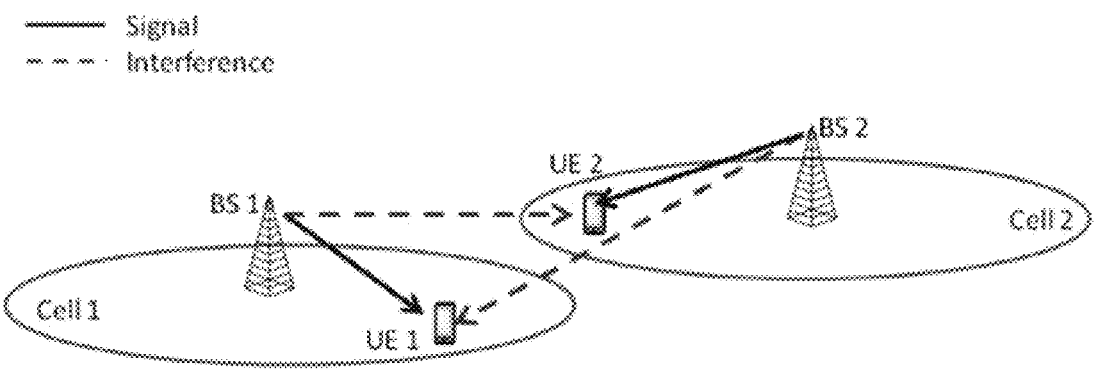
FIG. 1 illustrates graphical examples of Non CoMP based cellular system and CoMP based cellular system.
Figure 1B:
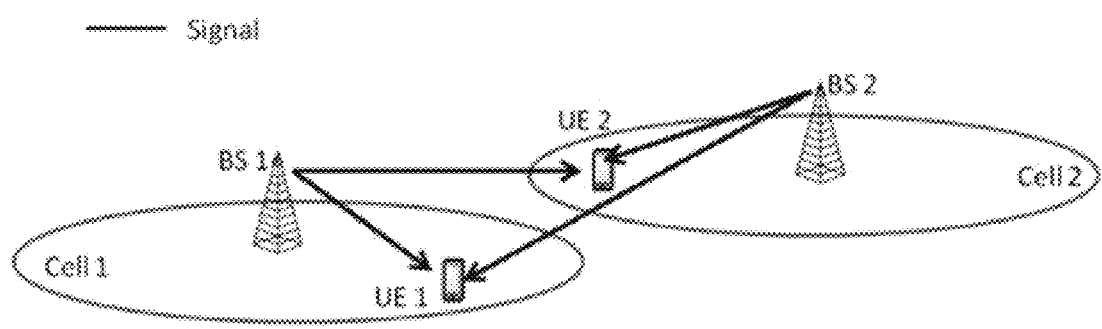
Figure 2:
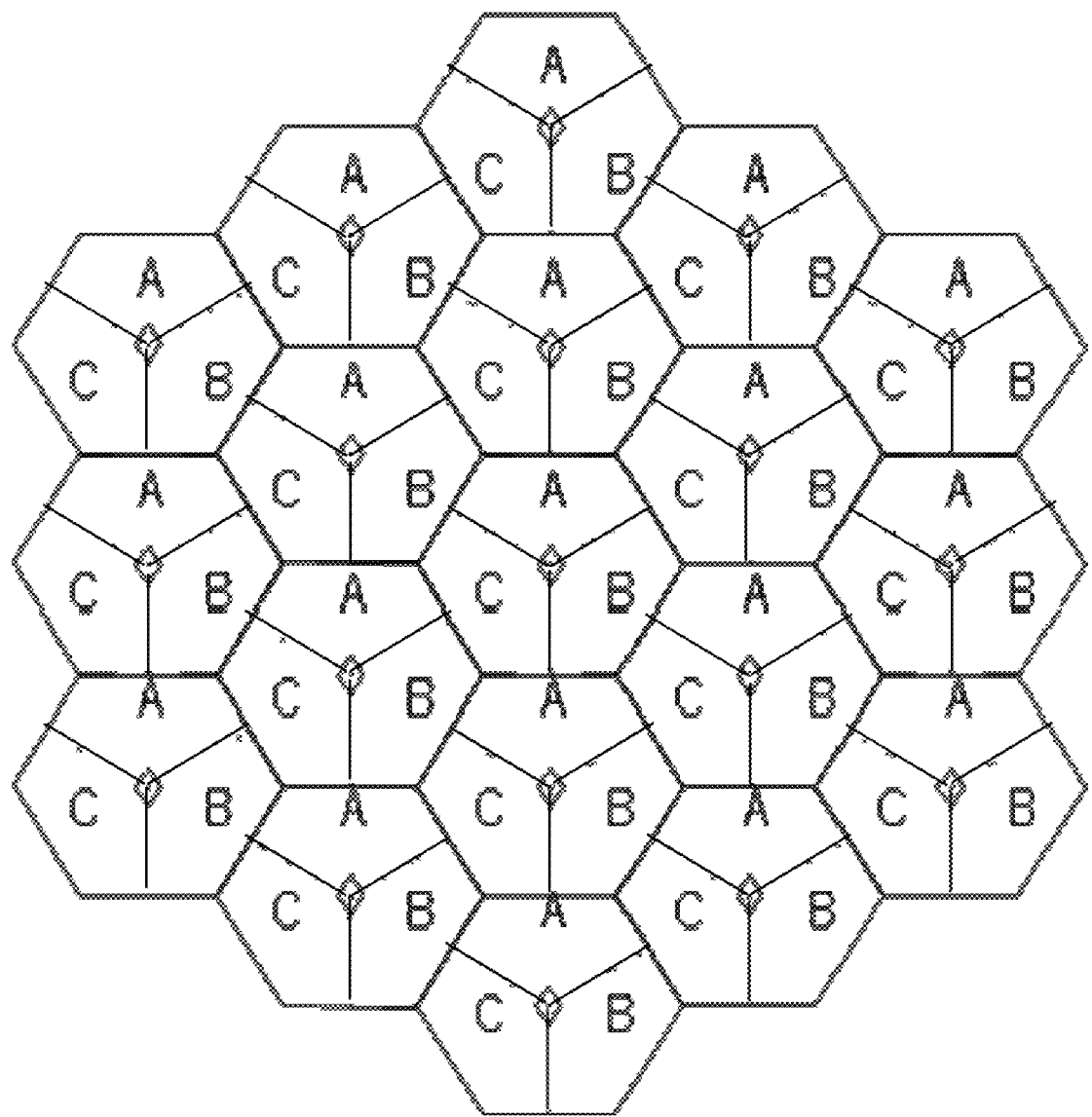
FIG. 2 illustrates a cellular system layout showing 19 cells and 57 sectors.
Figure 3A:
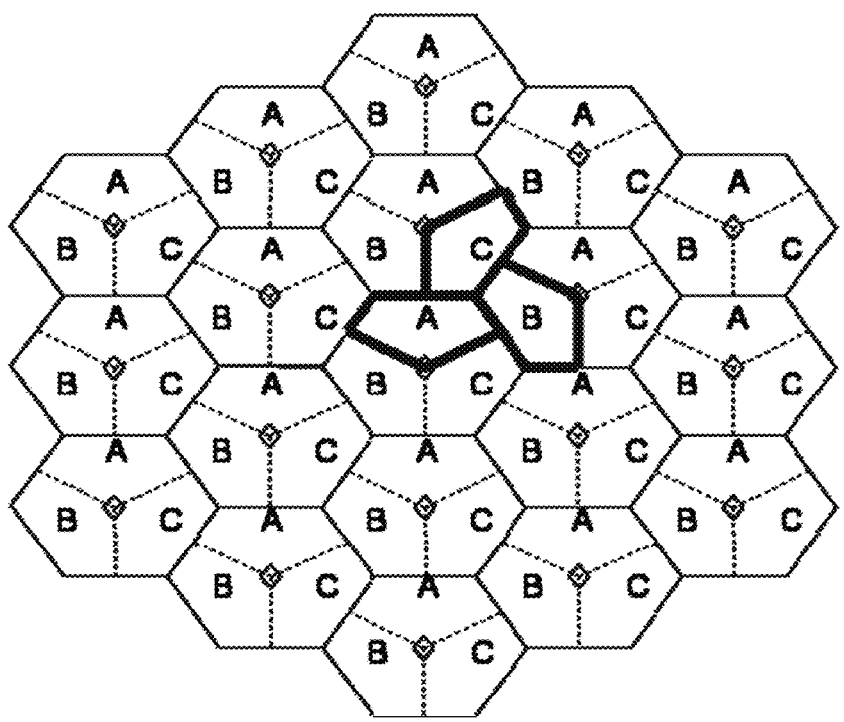
FIG. 3 illustrates configurations of fixed cell clustering.
Figure 3B:
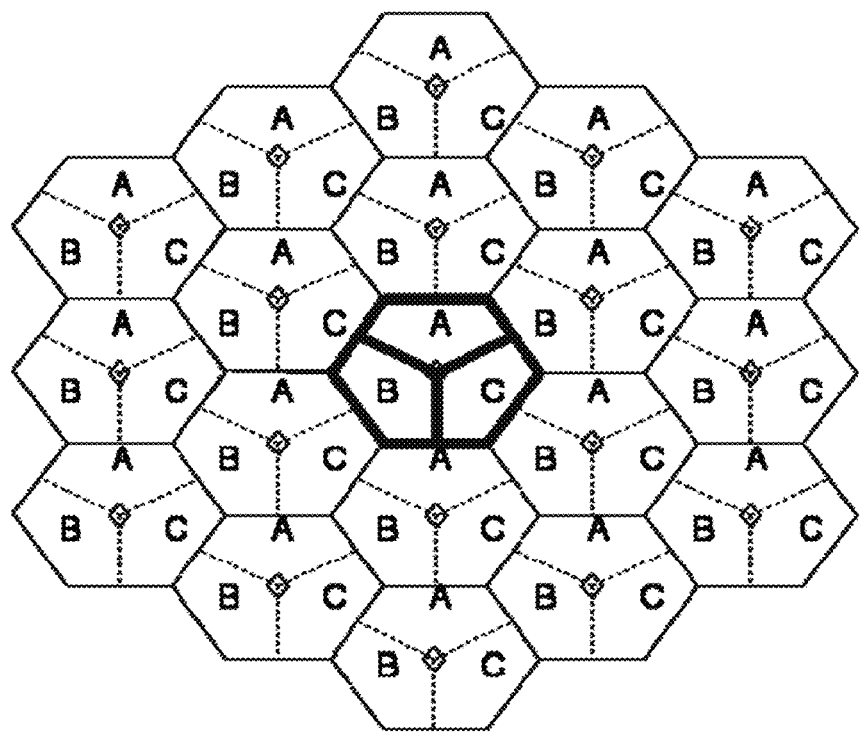
Figure 4A:
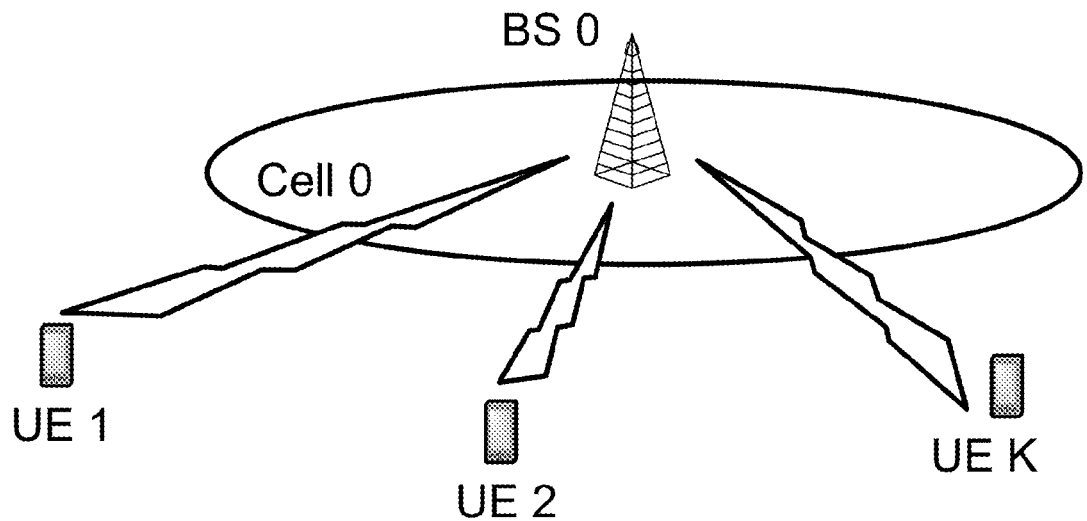
FIG. 4 illustrates a diagram depicting a scenario when out of cell UEs request a cell for CoMP and that the cell serves one of these out of cell UEs using CoMP.
Figure 4B:
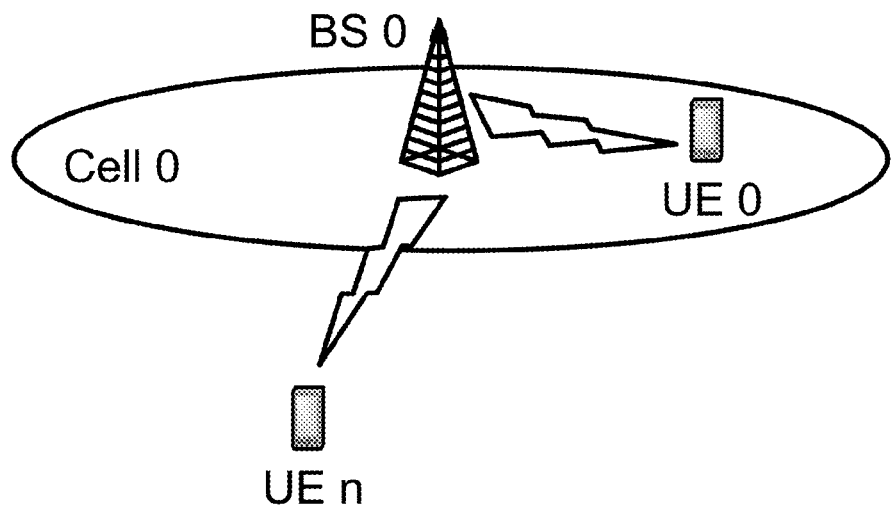
Figure 5:
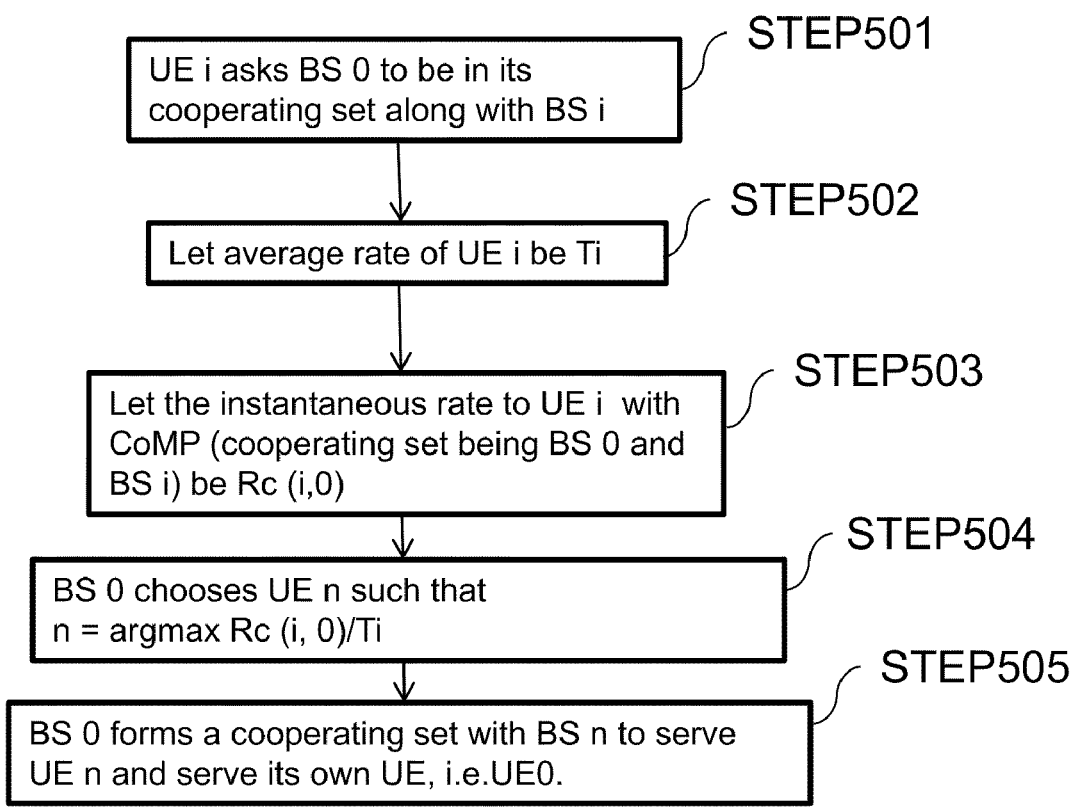
FIG. 5 illustrates an algorithm which a cell uses to decide which out of cell UE to serve to using CoMP.

FIG. 4A and FIG. 4B illustrate a diagram depicting a scenario when many out of cell UEs request a cell for CoMP and finally that the cell serves one of these out of cell UEs using CoMP, and FIG. 5 illustrates an algorithm which a cell uses to decide which out of cell UE to serve to using CoMP. First, let for UE i (i=1,2, . . . ,k), BS 0 has next strongest link gain after BS i as illustrated in FIG. 4A. Hence, each of UE i asks BS 0 to be in its cooperating set along with BS i (STEP501). Next, let average rate of UE i (i=1,2, . . . ,k) be Ti (STEP502). Assuming BS 0 serves only UE i, then let the instantaneous rate to UE i with CoMP (i.e. BS 0 and BS i forming the cooperating set) be Rc (i, 0) (STEP503). Then, BS 0 chooses UE n such that n equals to argmax Rc (i,0)/Ti (STEP504). Then, BS 0 forms a cooperating set with BS n to serve UE n and BS 0 also serves its own UE, which is UE 0 (STEP505) as illustrated in FIG. 4B.

Figure 6:
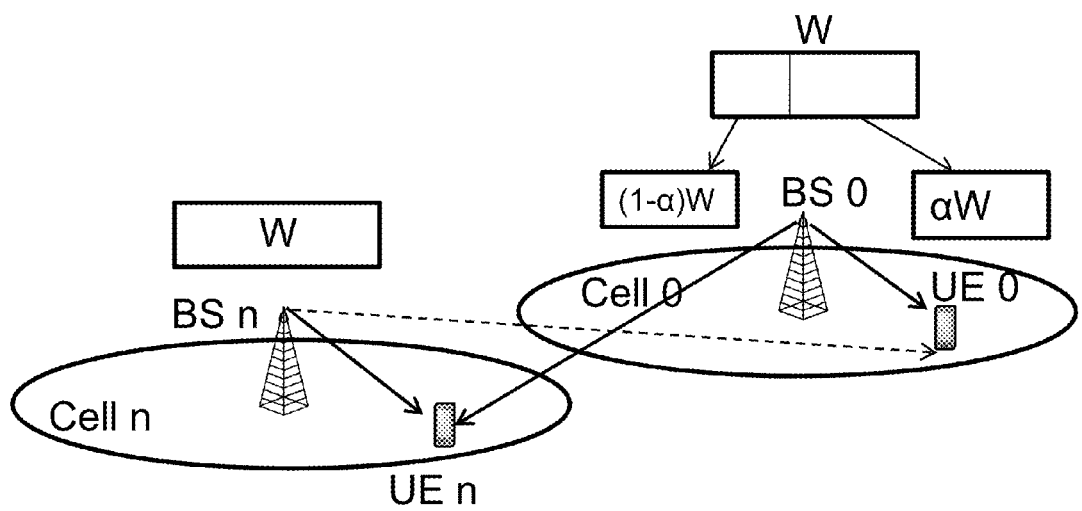
FIG. 6 illustrates an example with two cells and two UEs where one UE is CoMP enabled UE while another UE is non-CoMP enabled UE and how a cell partitions its frequency resource between non-CoMP enabled UE (its own UE) and CoMP enabled UE (UE from another cell requesting CoMP service).

FIG. 6 illustrates example with two cells and two UEs where UE n is CoMP enabled UE while UE 0 is non-CoMP enabled UE. In LTE Rel-8, there is no cooperation amongst BS to serve a UE. This is like the system where UE n resides where each BS allocates all its resources to serve its user. For example, BS allocates all its resources to serve its own UE. On the other hand, in Rel-10 CoMP, like the system where UE n resides, a BS can be in the cooperating set of some other UE due to which some of the resources are now spent for cooperation. Therefore, a BS has to maintain a sense of fairness to its own UEs during the process of cooperation.

For example, basically BS 0 has to take care of UE 0 as a matter of fairness. Note that if all the UEs were following CoMP, they would all have a set of BSs transmitting to them and the fairness issue for an individual UE is different. However, the illustrated example involves the network which comprises both kinds of UEs—those that have CoMP capability, i.e. UE n, and those that do not, i.e.UE 0.

UE n requests Cell 0 to be in its cooperating set and Cell 0 agrees. Cell 0 partitions its bandwidth into two parts and uses $\alpha W$ bandwidth for transmitting to UE 0 using SU transmission techniques. The remaining bandwidth $(1-\alpha)W$ is used to transmit to UE n. BS n transmits to UE n using the entire bandwidth W. Since UE 0 is non-CoMP enabled, it sees interference from BS n.

In practice, $\alpha W$ will be implemented in a discrete manner. For a 10 MHz bandwidth there are 50 Physical Resource Blocks (PRBs) per TTI with each PRB being of 180 KHz bandwidth. BS 0 could allocate N of them to UE 0, where N>25 and 50-N to UE n.

Cell 0, after frequency partitioning, follows LTE transmission to UE 0, the UE that was not Rel-10 enabled. For transmission to UE n, both cells can follow either CB/CS or JP CoMP techniques as aforementioned.

Figure 7:
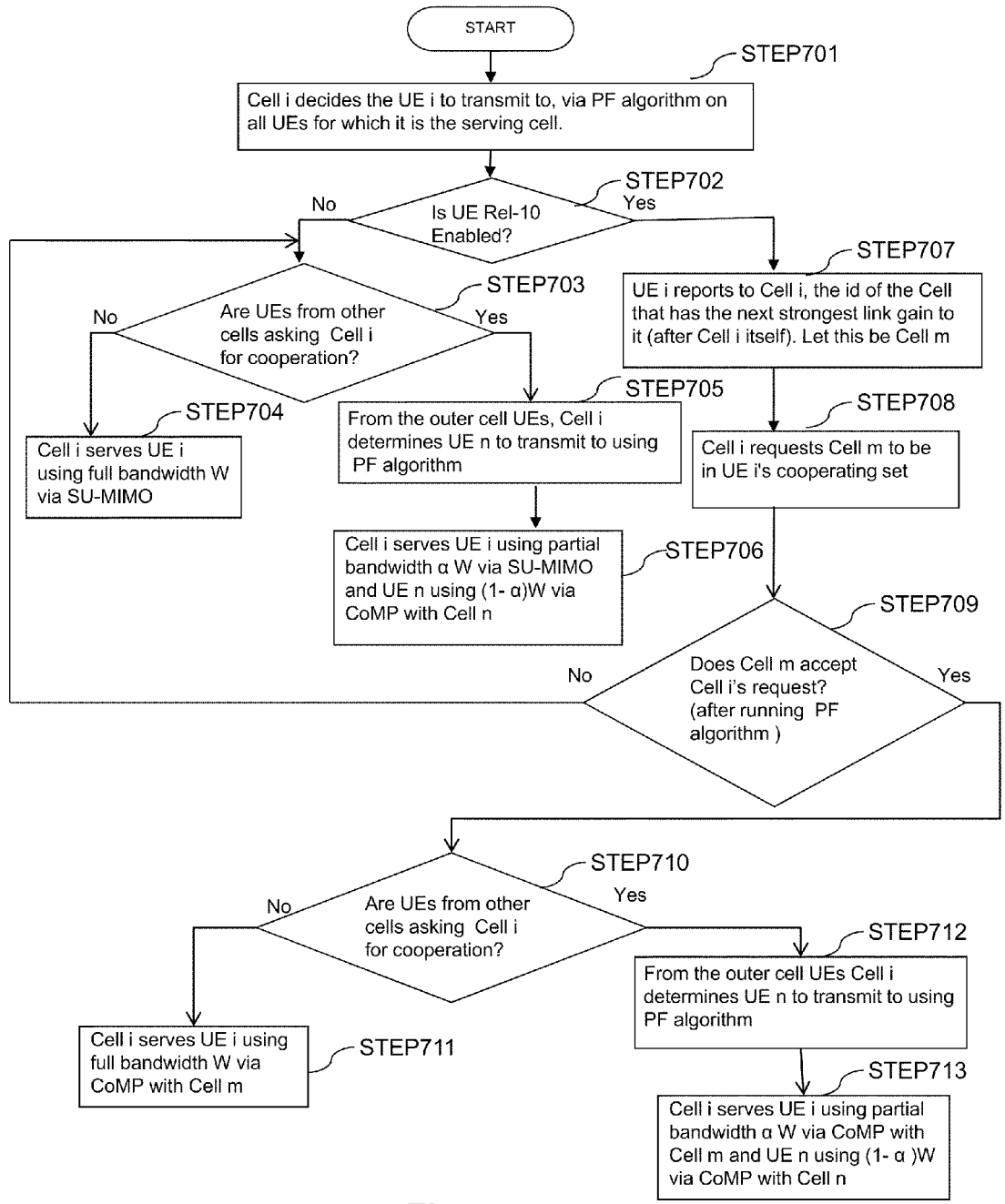
FIG. 7 is a flowchart which illustrates the whole algorithm including how a Cell initially chooses a UE for transmission, how it chooses a second out of cell UE for CoMP set formation and how it partitions its frequency and subsequently transmits to both these UEs.

FIG. 7 is a flowchart which illustrates a flowchart which illustrates the whole algorithm including how a Cell initially chooses a UE for transmission, how it chooses a second out of cell UE for CoMP set formation and how it partitions its frequency and subsequently transmits to both these UEs.

In STEP 701, at each TTI, each cell decides which UE to transmit to by running a PF algorithm. In this embodiment, Cell i decides the UE i to transmit to, via PF algorithm on all UEs for which it is the serving cell. In STEP 702, whether UE is CoMP-enabled is determined. In this embodiment, whether UE i is CoMP-enabled is determined. If the UE is not CoMP enabled, then the process proceeds to STEP 703. In STEP 703, whether UEs from other cells ask Cell i for cooperation is determined. If there is any request from UEs from other cells for cooperation, Cell i determines UE n to transmit to, using PF algorithm as illustrated in FIG. 5 (STEP705). Once Cell i determines UE n to transmit to, Cell i serves UE i using partial bandwidth $\alpha W$ via SU-MIMO and serves UE n using $(1-\alpha)W$ via CoMP with Cell n (STEP706). For fairness, it is assumed that $\alpha > 0.5$. If no UE from other cells requests a cell to be in their cooperating set, then the cell sets $\alpha=1$, i.e. used the full bandwidth to serve its UE (STEP704). If the UE does not request for CoMP mode, the serving cell transmits to the UE using full bandwidth or partial bandwidth. Note this is the baseline LTE case.

If the UE is CoMP-enabled, UE i reports to Cell i, the id of the Cell that has the next strongest link gain to it (i.e. after Cell i itself) (STEP707). In this embodiment, Cell m is assumed to be the Cell that has the next strongest link gain to UE i. Cell i requests Cell m to be in UE i's cooperating set (STEP708). Then whether Cell m accepts the request from Cell i for cooperation is determined (STEP709). If Cell m accepts the request from Cell i after running PF algorithm as illustrated in FIG. 5, Then, whether UEs from other cells asking Cell i for cooperation is determined (STEP710). If Cell m does not accept the request from Cell i, the process proceeds to STEP703.

If there is no request to Cell i from UEs from other cells for cooperation, Cell i serves UE i using full bandwidth W via CoMP with Cell m (STEP711). If there is any request to Cell i from UEs from other cells for cooperation, Cell i determines UE n to transmit to using a PF algorithm as illustrated in FIG. 5 (STEP712). Then, Cell i serves UE i using partial bandwidth a W via CoMP with Cell m and UE n using $(1-\alpha)W$ via CoMP via Cell n (STEP713).

The advantage of the embodiment of the present invention is the backward compatibility of CoMP enabled Rel-10 with Non-CoMP enabled Rel-8 as both types of UEs co-exist. The algorithm can be implemented with minimum complexity and gives flexibility to all UEs and BSs involved in the cellular system. Another embodiment of this invention is a new dynamic algorithm for forming a CoMP cooperating set. The UE initiates this cooperating set formation by sending requests to BSs and the BS chose only one UE in order to minimize computational complexity.

What is claimed is:

1. In a cellular system, which comprises a cell which comprises at least one user equipment (UE) to which the cell trasmits, a method comprising:
    determining a UE to which a first cell transmit;
    determining whether the UE is coordinated multipoint transmission/reception (CoMP) enabled; and
    if the UE is CoMP enabled, determining a second cell to transmit to the UE, requesting the second cell to transmit to the UE, and determining whether the second cell to transmit to the UE by whether the UE satisfies the condition:

the $UE = \arg\max Rc\,(i, 0)/Ti$, where,
    UEi (i is an integer or greater than 0),
    Rc=instantaneous rate to UEi with CoMP, and
    Ti=average rate of UE i.

2. The method of claim 1, further comprising:
    if the UE is Non-CoMP enabled, determining whether there is a request from a UE from another cell to the first cell for cooperation; and
    if there is a request, partitioning a bandwidth of the cell into first and second part of bandwidths, using the first part of bandwidth for transmitting to the UE in the first cell, and using the second part of bandwidth for transmitting to the UE in the another cell.

3. The method of claim 2, further comprising:
    if there is no request, transmitting to the UE in the first cell using full bandwidth of the first cell.

4. The method of claim 2, wherein the first part of bandwidth is represented as $\alpha W$ while the second part of bandwidth is represented as $(1-\alpha)W$.

5. The method of claim 1, further comprising:
    if the second cell decides to transmit, transmitting to the UE in the first cell using full bandwidth of the second cell.

\* \* \* \* \*